United States Patent
Sanford et al.

(10) Patent No.: US 11,187,847 B2
(45) Date of Patent: Nov. 30, 2021

(54) BACKLIGHT INCLUDING WIDE-WEB TURNING FILM AND REFLECTIVE POLARIZER WITH QUARTER-WAVE RETARDER

(71) Applicant: 3M INNOVATIVE PROPERTIES COMPANY, St. Paul, MN (US)

(72) Inventors: Quinn D. Sanford, Ellsworth, WI (US); Kenneth A. Epstein, St. Paul, MN (US); Matthew B. Johnson, Woodbury, MN (US); Gary T. Boyd, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 171 days.

(21) Appl. No.: 16/619,300

(22) PCT Filed: Jun. 5, 2018

(86) PCT No.: PCT/US2018/036081
§ 371 (c)(1),
(2) Date: Dec. 4, 2019

(87) PCT Pub. No.: WO2018/226711
PCT Pub. Date: Dec. 13, 2018

(65) Prior Publication Data
US 2021/0278586 A1    Sep. 9, 2021

Related U.S. Application Data

(60) Provisional application No. 62/515,861, filed on Jun. 6, 2017.

(51) Int. Cl.
*F21V 8/00* (2006.01)
*G02B 5/30* (2006.01)

(52) U.S. Cl.
CPC ......... *G02B 6/0056* (2013.01); *G02B 5/3041* (2013.01); *G02B 6/0053* (2013.01); *G02B 6/0055* (2013.01)

(58) Field of Classification Search
CPC .. G02B 6/0056; G02B 6/0053; G02B 6/0055; G02B 6/3041
USPC .......................................... 362/607
See application file for complete search history.

(56) References Cited

U.S. PATENT DOCUMENTS

| | | |
|---|---|---|
| 8,657,472 B2 | 2/2014 | Aronson |
| 8,888,333 B2 | 11/2014 | Yapel |
| 10,955,715 B2 * | 3/2021 | Woodgate ......... G02F 1/133504 |
| 2007/0132915 A1 * | 6/2007 | Mi ........................ G02B 6/0053 349/64 |

(Continued)

FOREIGN PATENT DOCUMENTS

| | | |
|---|---|---|
| JP | 2009-211873 | 9/2009 |
| WO | WO 2016-205130 | 12/2016 |

OTHER PUBLICATIONS

International Search Report for PCT International Application No. PCT/US2018/036081, dated Sep. 19, 2018, 3 pages.

*Primary Examiner* — Bryon T Gyllstrom
(74) *Attorney, Agent, or Firm* — Michael Stern

(57) ABSTRACT

Backlights are described. In particular, backlights including wide-web turning films and reflective polarizers having quarter-wave retarders are disclosed. Such configurations can provide turning film systems with improved luminance uniformity for large format displays.

10 Claims, 1 Drawing Sheet

(56) References Cited

U.S. PATENT DOCUMENTS

| | | | |
|---|---|---|---|
| 2007/0133226 A1* | 6/2007 | Mi | G02B 27/288 |
| | | | 362/607 |
| 2007/0147066 A1* | 6/2007 | Boyd | G02F 1/133611 |
| | | | 362/600 |
| 2008/0218858 A1* | 9/2008 | Mi | G02B 6/0053 |
| | | | 359/485.01 |
| 2010/0302479 A1 | 12/2010 | Aronson | |
| 2011/0051047 A1* | 3/2011 | O'Neill | G02B 6/0096 |
| | | | 349/67 |
| 2011/0149554 A1 | 6/2011 | Ouderkirk | |
| 2015/0260903 A1* | 9/2015 | Kashima | G02B 6/0056 |
| | | | 349/65 |
| 2015/0293272 A1 | 10/2015 | Pham | |
| 2016/0154163 A1 | 6/2016 | Jang | |
| 2018/0100963 A1* | 4/2018 | Boyd | G02B 6/0053 |
| 2020/0041707 A1 | 2/2020 | Johnson | |
| 2020/0262351 A1* | 8/2020 | Toyooka | G02F 1/1335 |

* cited by examiner

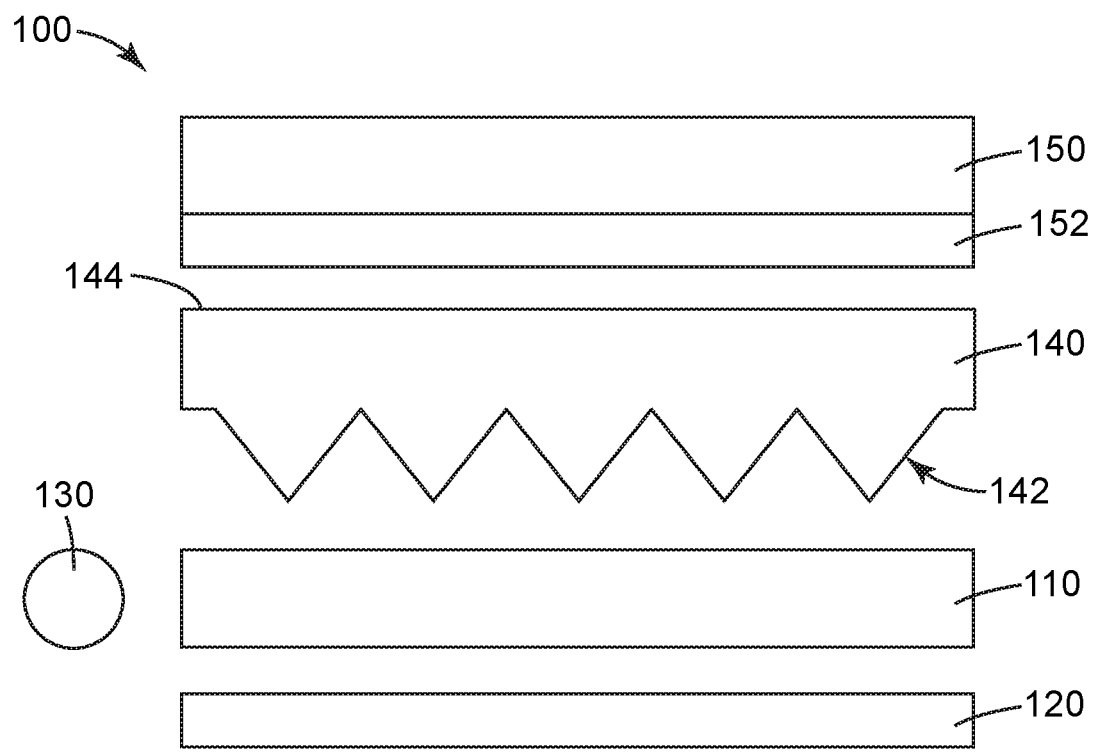

BACKLIGHT INCLUDING WIDE-WEB TURNING FILM AND REFLECTIVE POLARIZER WITH QUARTER-WAVE RETARDER

BACKGROUND

Backlights provide uniform illumination to liquid crystal display panels in order to produce an image for viewing. Reflective polarizers preferentially reflect light of one polarization and transmit light of an orthogonal polarization. Reflective polarizers, in conjunction with a reflector, may be used to increase efficiency through light recycling. Quarter-wave retarders change the phase of light by retarding one of the orthogonal components of the light by approximately a quarter wavelength.

SUMMARY

In one aspect, the present description relates to backlights. In particular, the present description relates to backlights including a lightguide, a reflector, at least one light source disposed along an edge of the lightguide, a wide-web turning film disposed on an opposite side of the lightguide from the reflector having a first major surface including prisms and a second major surface including a structured diffusing surface, and a reflective polarizer disposed further from the lightguide than the wide-web turning film having a quarter-wave retarder disposed thereon, the quarter-wave retarder being between the reflective polarizer and the wide-web turning film. The wide-web turning film includes a birefringent substrate, and the birefringent substrate has an in-plane fast axis that varies by at least five degrees along at least one direction. The quarter-wave retarder has a retardance for 550 nm light within 50 nm of 137.5 nm. The wide-web turning film has a diagonal size of at least 32 inches.

BRIEF DESCRIPTION OF THE DRAWINGS

FIG. 1 is a schematic elevation view of a backlight.

DETAILED DESCRIPTION

Turning film systems are used in backlights for displays. Turning films may have certain advantages in displays generally over conventional backlight stacks. Turning film backlights, relying on the controlled redirection of light from a collimated light guide, do not require additional prism films to recycle and redirect light in order to provide a desired luminance distribution. Further, because diffusion may be incorporated into the turning film itself, a separate diffusion layer is not required within the system for defect hiding. This allows a thinner overall stack and a simpler supply chain and assembly process.

Turning films themselves are typically microreplicated on a substrate. Commonly, oriented polyethylene terephthalate is desirable because of its low cost, wide availability, and easy processing. However, polyethylene terephthalate when oriented develops substantial birefringence. Due to certain inevitable non-uniformities in the stretching of polyethylene terephthalate, the fast axis of the birefringent substrate might vary substantially over the cross-web direction of the polyethylene terephthalate web. When viewed through a linearly polarizing element such as a reflective polarizer or an absorbing polarizer (conventionally used in liquid crystal displays), the variation in fast axis direction can lead to a corresponding variation in light transmitted through the polarizers. A viewer may then observe unintended and undesirable brightness variations across the display screen. For small-format devices, this can be avoided by converting only small parts, over which the fast axis does not vary significantly. However, for notebook, monitor, and especially television size parts, all or nearly all of the cross-web width must be used in the same part. Accordingly, it was believed that turning film systems were inappropriate for use in larger size displays, because the wide-web turning film that would be required would have a fast-axis variation that would ruin the display quality.

In the present description, turning film systems that use wide-web turning films are described. By incorporating a reflective polarizer with a quarter-wave plate disposed thereon, these turning film systems surprisingly showed excellent visual uniformity, and even viewing angle improvement. As designs trend toward thinner and thinner displays, the design flexibility afforded by the reduction of the number of required films is a strongly desirable benefit.

FIG. 1 is a schematic elevation view of a backlight. Backlight 100 includes lightguide 110, reflector 120, light source 130, wide-web turning film 140 having a first major surface 142 including prisms and a second major surface 144 including a structured diffusing surface, and reflective polarizer 150 including quarter-wave retarder 152.

Lightguide 100 may be any suitable size or shape, and may be formed from any suitable material. In some embodiments, lightguide 110 may be formed from an injection molded monolithic piece of acrylic, for example, or it may be formed from any other suitable material. Lightguide 110 may have its material selected for advantageous optical characteristics, such as high transmission, low absorption, or low scattering, or physical characteristics such as rigidity, flexibility, or temperature and warp resistance. In some embodiments, lightguide 110 may be a wedge lightguide. In some embodiments, lightguide 110 may include or contain extraction features, such as printed dots, negative microfeatures (i.e., indentations where the air/lightguide interface tends to defeat total internal reflection by scattering or reflecting light at subcritical angles, which then passes through the other surface of the lightguide), or positive microfeatures. The extraction features may be arranged in a gradient pattern so that light is evenly extracted over the area of the lightguide (and, ultimately, backlight 100 overall). In other words, the extraction features may be less densely packed in portions of the lightguide that have more overall light, such as the area proximate the light source. Alternatively, for some applications, the extraction features may be more densely packed in areas where greater light output is desired, such as under the numbers or buttons on a phone keypad or the like. The extraction features may vary in size, shape, and number either periodically, in a gradient, or non-periodically.

Reflector 120 is any suitable layer that is a broadband reflector of light. In some embodiments, reflector 120 is a metallic reflector, such as aluminum or silver, or a substrate with a metallic reflecting surface deposited thereon. In some embodiments, reflector 120 is a multilayer optical film.

Similarly to the multilayer optical film reflective polarizer described herein, the multilayer optical film reflector includes alternating high and low index layers of polymeric materials carefully selected and capable of developing birefringence when oriented. The layers are coextruded and oriented such that a broad spectrum of light is reflected by the interfaces between the layers through constructive interference. The optical thickness of each layer pair is designed such that different layer pairs contribute to the reflection of different wavelengths of light. An exemplary multilayer optical film reflector is Enhanced Specular Reflector, or ESR (available from 3M Company, St. Paul, Minn.). Suitable reflectors may reflect at least 90% of light, 95%, 98% of light, or even 99%. The reflector may provide a reflection pattern characterized as diffuse (or even Lambertian), specular, or semi-specular.

Light source 130 may be any suitable light source or combination of light sources. Conventional light sources such as light emitting diodes (LEDs), cold cathode fluorescent lamps (CCFLs), and even incandescent bulbs may be used. In some embodiments, although light source 130 is depicted as a single object in FIG. 6, combinations of LEDs may be used to provide a sufficiently white input light, but, depending on the application, any suitable spectra or combination of spectra may be utilized. In some embodiments, the LEDs may use phosphors or other downconverting elements. Light source 130 may include suitable injection or collimation optics to aid in coupling light into lightguide 110 or to help shape the light input for the lightguide. Light source 130 may be disposed on either side of lightguide 110: the rest of the components of backlight 100 can be adjusted accordingly.

Wide-web turning film 140 may be any suitable turning film. Typically, turning films at least have some sort of prism or prism-like structure facing toward the lightguide in order to redirect light incident thereon through total internal reflection. As shown in FIG. 1, wide-web turning film 140 includes prisms on first major surface 142, and has a structured diffusing surface on second major surface 144. In FIG. 1, it should be understood that only a portion of backlight 100 is shown, and not the entire width of wide-web turning film is represented, which might include hundreds of thousands or millions of individual prisms. In some embodiments, one or more of the prisms may have or include at least one curved face. In some embodiments, the prisms may be linear prisms. By linear, it is meant that a peak of one of the prisms is a line across the first major surface (when viewed, for example, from a plan view). In some embodiments, and for practical reasons including the limits of manufacturing processes, linear prims may include small deviations from precisely linear. In some embodiments, the prisms may be linear but for a periodic or nonperiodic variation in pitch. In some embodiments, the prisms may be linear but may vary in height, either periodically or nonperiodically. In some embodiments, there may be space or "land" between adjacent prisms. The spacing may be constant or varying.

In some embodiments, wide-web turning film 140 may be replaced with one or more (typically two) conventional brightness enhancement films. These brightness enhancement films are typically configured as "prisms up," with the prisms facing away from the lightguide, the opposite of as is illustrated in FIG. 1. In some embodiments, the two brightness enhancement films are rotated 90 degrees from each other to provide viewing angle enhancement in substantially all directions. Descriptions and design considerations for wide-web turning film 140 can be applicable to brightness enhancement films, if used in backlights described herein.

Wide-web turning film 140 may be large or very large. In some embodiments, wide-web turning film 140 may have a diagonal dimension of 9 inches or greater In some embodiments, wide-web turning film 140 may have a diagonal dimension of 14 inches or greater. In some embodiments, wide-web turning film 140 may have a diagonal dimension of 17 inches or greater. In some embodiments, wide-web turning film 140 may have a diagonal dimension of 19 inches or great. In some embodiments, wide-web turning film 140 may have a diagonal dimension of 32 inches or greater. In some embodiments, wide-web turning film 140 may have a diagonal dimension of 42 inches or greater. In some embodiments, wide-web turning film 140 may have a diagonal dimension of 55 inches or greater. In useful embodiments, the wide-web turning film exhibits birefringence, typically due to birefringence in the substrate the prisms are carried on. In some embodiments, the wide-web turning film exhibits, along at least one direction, a variation in its in-plane fast axis by five degrees or more. In some embodiments, the wide-web turning film exhibits, along at least one direction, a variation in its in-plane fast-axis by ten degrees or more.

Depending on the application, certain characteristics of the overall design of backlight 100 may have a significant impact on its performance. In particular, the design of the bottom structured surface 142 of wide-web turning film 140 and the output distribution of lightguide 110. The design of lightguide 110 may take into account that wide-web turning film 140 may have certain input angles that provide a more desirable output than certain other input angles; in other words, the lightguide and backlight overall may be designed to provide wide-web turning film 140 with these input angles. The opposite is also possible: wide-web turning film 140 may be designed to have the output angle of the lightguide be an input angle that provides a desirable output.

In some embodiments, some level of diffusion or haze is desirable for the hiding of visual defects from manufacturing, assembly, or through use and environmental exposure or for visual interference such as moiré patterns. Further, in some embodiments, diffusion can be used to control the output angle distribution for the backlight luminance, either spreading it along some or all directions, or even narrowing the distribution along some or all directions. Wide-web turning film 140 may include a surface diffusing structure on the bottom structured surface or on the top structured surface. Such a surface diffusing structure may be on all or only some of the surfaces; for example, a surface diffusing structure may be on only one side of the structures. In some embodiments, the surface diffusing structure may be between the structured surface and the underlying substrate. Alternatively or additionally, any of the structures of the structured surfaces or any substrate layer may have a bulk diffusing or scattering element. In some embodiments, wide-web turning film 140 may include an embedded matte layer; i.e., a diffusing layer between the structured surface and the underlying substrate having an index of refraction different than at least one of the structured surface layer and its underlying substrate. In some embodiments, second major surface 144 of wide-web turning film 140 includes a structured diffusing surface. In some embodiments, second major surface 144 of wide-web turning film 140 includes beads.

A quantity for characterizing either the surface diffusing structure is the slope distributions of the surface. Slope distributions provide a particularly useful characterization of the surface diffusing structure in embodiments where it is desired to have relatively shallow slopes (for example, most slopes less than 40 degrees). In some embodiments, no more than about 20 percent, or no more than about 10 percent, or no more than about 7 percent, or no more than about 5 percent, or no more than about 3 percent of the surface diffusing structure has a slope magnitude that is greater than about 20 degrees, greater than about 15 degrees, greater than about 10 degrees, or greater than about 7 degrees, or greater than about 5 degrees, or greater than about 3.5 degrees. In some embodiments, the surface diffusing structure may have steeper slopes. For example, in some embodiments, no more than about 20 percent, no more than about 10 percent, no more than about 7 percent of the surface diffusing structure has a slope magnitude that is greater than about 20 degrees, or greater than about 30 degrees, or greater than about 35 degrees or greater than about 40 degrees. In some embodiments, a substantial fraction of surface diffusing structure has a slope magnitude greater than 1 degree and a substantial fraction of the second major surface has a slope magnitude less than 10 degrees or less than 15 degrees. In some embodiments, at least about 50 percent, or at least about 70 percent, or at least about 80 percent, or at least about 85 percent, or at least about 90 percent of the surface diffusing structure has a slope magnitude that is greater than 1 degree. In some embodiments, no more than about 85 percent, or no more than about 80 percent, of the surface diffusing structure has a slope magnitude that is greater than about 15 degrees, or that is greater than about 10 degrees.

In some embodiments, the slope distributions may be measured separately along two orthogonal directions. These slopes may have very small magnitudes along one direction, and larger magnitudes along a second, orthogonal direction. In other words, the slope distributions may be asymmetric. In some embodiments, the slopes along one direction may have magnitude distributions as described above (except while there applied there to the entire surface, here along a single direction). In some embodiments, there may be a very narrow distribution of slopes around zero or some other constant, or no slope (e.g., a flat or constant slope) along one direction. In some embodiments, at least 50 percent, at least 70 percent, at least 80 percent, at least 85 percent, or at least 90 percent of the slope magnitudes along one direction are less than 0.5 degrees, or less than 0.1 degrees. In some embodiments, at least 50 percent, at least 70 percent, at least 80 percent, at least 85 percent, or at least 90 percent of the slope magnitudes along one direction are less than 0.5 degrees, or less than 0.1 degrees from a same non-zero slope. In some embodiments, the asymmetrically larger slope distribution direction may be orthogonal to the direction of the linearly extended direction of the top structures or the bottom structures (i.e., along the x- or y-axis) or the larger slope distribution direction may be parallel to the direction of the linearly extended direction of the top structures or the bottom structures.

The slopes of the structured surface can be characterized using atomic force microscopy (AFM) or confocal scanning laser microscopy (CSLM), for example, to determine a surface profile H(x,y) (i.e., a height, H, of the surface above a reference plane as a function of the orthogonal in-plane coordinates x and y). Slopes $S_x$ and $S_y$ along respective x- and y-directions can then be calculated from the following two expressions:

$$S_x = \frac{\partial H(x, y)}{\partial x}$$
$$S_y = \frac{\partial H(x, y)}{\partial y}.$$

The slope magnitude $S_m$ can be calculated from the following expression:

$$S_m = \sqrt{\left[\frac{\partial H}{\partial x}\right]^2 + \left[\frac{\partial H}{\partial y}\right]^2}.$$

A cutting tool system used to cut a tool which can be microreplicated to produce a surface diffusing structure may employ a thread cut lathe turning process and includes a roll that can rotate around and/or move along a central axis by a driver, and a cutter for cutting the roll material. The cutter is mounted on a servo and can be moved into and/or along the roll along the x-direction by a driver. In general, the cutter is mounted normal to the roll and the central axis and is driven into the engraveable material of roll while the roll is rotating around the central axis. The cutter is then driven parallel to the central axis to produce a thread cut. The cutter can be simultaneously actuated at high frequencies and low displacements to produce features in the roll that when microreplicated result in surface diffusing structures. The cutter can be any type of cutter and can have any shape that may be desirable in an application. Suitable cutters are described in U.S. Pat. No. 8,657,472 (Aronson et al.) or U.S. Pat. No. 8,888,333 (Yapel et al.).

In some embodiments, a surface diffusing structure may be formed using a tool textured through electroplating. The method of forming these structures and diffusing films created thereby are described in U.S. Pre-Grant Patent Publication No. 2010-00302479 (Aronson et al.). In some embodiments, a surface diffusing structure may be formed using a multiple-stage electroplating process. The method of forming these structures and diffusing films created thereby are described in U.S. Pre-Grant Publication No. 2015-0923272 (Pham et al.).

Reflective polarizer 150 may be any suitable reflective polarizer. Reflective polarizers are characterized by the at least partial—or in many cases substantial—reflection of a first polarization while largely transmitting a second, orthogonal polarization. In some embodiments, reflective polarizer 150 may have quarter-wave retarder 152 disposed thereon, between the reflective polarizer and the wide-web turning film. Retarders are optical layers that retard one of the orthogonal components of incident light in order to change the phase and alter polarization. Quarter-wave refers to such a retarder having a retardance approximately equal to a quarter wavelength of incident light. Because retardation typically varies with wavelength, it is helpful to identify a test wavelength. In some embodiments, quarter-wave retarder 152 has a retardance within 50 nm of 137.5 for 550 nm light. In some embodiments, quarter-wave retarder 152 is an achromatic retarder, so that over an extended wavelength range the retardance of quarter-wave retarder does not change significantly (for example, no more than ±50 nm over an extended wavelength range). The quarter-wave retarder and the reflective polarizer may be stacked, laminated, or otherwise attached. In some embodiments, additional layers such as adhesives, protective layers, or diffusion layers may be present. Effectively, the combination of reflective polarizer 150 and quarter-wave retarder 152 may function as a circular reflective polarizer, in that the combination at least partially reflects light having a first polarization handedness while largely transmitting the other polarization handedness. The quarter-wave retarder may be or include, in some embodiments, a liquid crystal polymer. In some embodiments, the quarter-wave retarder may include a thick birefringent layer.

Reflective polarizers may be multilayer reflective polarizers. Multilayer reflective polarizers are formed from coextruded packets of alternating high and low index layers that, when oriented appropriately, possess internal index of refraction interfaces having appropriate thickness to reflect light of certain polarizations through constructive interference. Examples of reflective polarizers include DBEF and APF, (available from 3M Company, St. Paul, Minn.). Diffuse reflective polarizers may be formed from an oriented immiscible blend of two polymers, where at least one of the polymers is capable of developing birefringence when stretched.

The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

EXAMPLES

The angular distribution of luminance as a function of viewing angle was determined using a conoscope for a conventional backlight stack and turning film systems with a wide-web backlight stack. Additionally, the cross web luminance variation for turning film systems was determined by measuring the luminance of the turning film system with turning films selected from different locations across the web width. The luminance varies cross web due to optical axis variation in the turning film substrate and due to surface structure variation, including matte and prism structures.

All examples use turning films with matte and prism structures. The construction details of the turning films is provided in Table 1. The prisms are plano-convex. The Apex refers to the angle at the prism tip between the plano facet and the chord of the convex facet. The Rtip refers to the radius of curvature of the prism tip. The Rvalley refers to the radius of curvature of the prism valley. The Matte Haze value (characterized by a hazemeter) also varies slightly cross web. These variations are in addition to turning film substrate fast axis variations. The matte (surface diffusing) structure was formed using a tool formed with a multiple-stage electroplating process (described in U.S. Pre-Grant Publication No. 2015-0923272 (Pham et al.)).

brightness enhancement film prisms, the second brightness enhancement film is disposed on a diffuser layer, a lightguide plate is disposed on the diffuser layer, and a white reflector is disposed under the lightguide plate opposite the diffuser layer. 3M brightness enhancement films, diffuser layers, and white reflectors in this example are commercially available from 3M (Saint Paul, Minn.). One sample was prepared using a conventional backlight stack for testing conoscopic luminance in a turning film system.

Sample 1 was prepared with a conventional backlight stack cut to fit a Sony 55W900A (Sony Corporation, Tokyo, Japan) display. A Sony 55W900A LCD panel was adhered to the 3M DBEF D4-400 of the conventional backlight stack. The lightguide plate in the conventional backlight stack was from a Sony 55W900A display.

Preparation of Wide-Web Backlight Stack

A wide-web backlight stack for a turning film system was prepared. The wide-web backlight stack includes an absorbing polarizer adhered to a quarter wave plate, where the quarter wave plate consists of a reflective polarizer with a quarter wave retarder coating, the surface coated with a quarter wave retarder of the quarter wave plate disposed on a wide-web turning film having a first major surface including prisms and a second major surface including a structured diffusing surface where the second major surface is adjacent the quarter wave plate, a lightguide plate disposed on the first major surface of the wide-web turning film, and a 3M specular reflector adhered to the lightguide plate.

Reflective polarizers, quarter wave plates, optically clear adhesives, and specular reflectors in this example are commercially available from 3M, Saint Paul, Minn. Turning film type A, described in Table 1, was used as the wide-web turning film.

Sample 2 in Table 2 was prepared with a wide-web backlight stack cut to fit a Sony 55W900A display. A Sony 55W900A LCD panel was adhered to the reflective polarizer of the wide-web backlight stack. The lightguide plate in the wide-web backlight stack was from a Sony 55W900A display.

TABLE 1

Turning Film Construction Details

| Type | Film thickness (μm) ± 0.6 μm | PET (μm) | Pitch (μm) | Height (μm) | Apex (deg) | Rfacet (μm) | Rtip (μm) | Rvalley (μm) | Matte Haze | Resin Index |
|---|---|---|---|---|---|---|---|---|---|---|
| A | 169.5 | 125 ± 5 | 44.4 | 36.7 | 61 | 110 | 0.2 | 0.7 | 93% | 1.5 |
| B | 157 | 125 ± 5 | 27.4 | 22.6 | 62 | 57 | 0.2 | 0.5 | 93% | 1.5 |

Example 1—Angular Distribution of Luminance as a Function of Viewing Angle

Preparation of a Conventional Backlight Stack

A conventional backlight stack was prepared that includes a 3M reflective polarizer, DBEF D4-400 (3M, Saint Paul, Minn.) disposed on a first 3M brightness enhancement film, where a major surface, including prisms, of the first brightness enhancement film is adjacent a major surface of the 3M DBEF D4-400, the first brightness enhancement film is disposed on a second brightness enhancement film, where a major surface, including linear prisms, of the second brightness enhancement film is adjacent a major surface, not including prisms, of the first brightness enhancement film and the direction along the first brightness enhancement film prisms is orthogonal to the direction along the second Testing The angular distribution of light from a turning film system was determined using a conoscope (Eldim L80 available from Eldim, Herouville Saint Clair, France) for turning film systems with the samples described above. The luminance normal to the display was determined (Axial Luminance). The polar angles from the normal at which the luminance is half of the axial value, measured along a fixed azimuthal angle were determined from the conoscopic data to determine the Full Width at Half Maximum (FWHM). The axial luminance and FWHM of each sample was determined and compared with the turning film system including a conventional backlight stack and the respective display of the comparative sample, Table 2.

TABLE 2

Conoscopic Output including Axial Luminance Increase over Conventional Backlight Stack and the FWHM.

| Sample | Display | Axial Luminance Relative to Conventional Backlight Stack | FWHM (degrees) |
|---|---|---|---|
| 1 | Sony 55W900A | 100% | 86 |
| 2 | Sony 55W900A | 134% | 74 |

A wide-web backlight stack shows improved axial luminance over a conventional backlight stack in a large format display. Additionally, the FWHM is less in a wide-web backlight stack than in a conventional backlight stack. The 34% increase in axial luminance is consistent with the ratio of the square of the FWHM, sample 2 having a more focused output. It was also observed that the wide-web backlight stack yielded excellent uniformity in luminance across the display when compared with a conventional backlight stack in the same display.

Example 2—Cross Web Luminance Variation

Preparation of Backlight Stacks

Each backlight stack, sample, includes a top plate disposed on a turning film, a lightguide film disposed under the turning film, and a specular reflector disposed under the lightguide film where the turning film has a major surface including prisms and where that major surface is adjacent the lightguide film.

There are three types of top plates: a glass plate adhered to an absorbing polarizer (P1), a glass plate adhered to an absorbing polarizer adhered to a reflective polarizer (P2), and a glass plate adhered to an absorbing polarizer adhered to a quarter wave plate, where the quarter wave plate consists of a reflective polarizer with a quarter wave retarder coating (P3).

The turning film in this example is type B, described in Table 1. The turning film used in the samples is the result of a wide web PET substrate slit into two parallel portions, labeled cut 1 and cut 2. The cuts are distinguished by their differences in their variation of fast axis across their respective widths. The turning film in the samples was selected from one of six locations approximately equally spaced across the cut width.

A number of samples were prepared for each sample type. Each sample has a sample type where the difference between sample types is the top plate type, the cut, and the top plate bias defined by the angle relative to the pass axis of the absorbing polarizer and the source edge of the lightguide, Table 3.

TABLE 3

Turning Film System Sample Types

| Sample Type | Number of Samples | Top Plate Type | Cut | Top Plate Bias (deg) |
|---|---|---|---|---|
| S1 | 21 | P1 | 1 | 0 |
| S2 | 21 | P2 | 1 | 0 |
| S3 | 21 | P3 | 1 | 0 |
| S4 | 24 | P1 | 2 | 0 |
| S5 | 24 | P2 | 2 | 0 |
| S6 | 24 | P3 | 2 | 0 |
| S7 | 22 | P1 | 1 | 90 |
| S8 | 22 | P2 | 1 | 90 |
| S9 | 22 | P3 | 1 | 90 |
| S10 | 24 | P1 | 2 | 90 |
| S11 | 24 | P2 | 2 | 90 |
| S12 | 24 | P3 | 2 | 90 |

Testing

Axial luminance variation from a turning film system was determined for turning film systems with the sample types described above. Axial luminance measurements were collected from samples of each sample type using a photospectrometer PR650 (Photo Research, Syracuse, N.Y.). Light emitting diodes supplied light into the lightguide source edge and the luminance normal to the display was determined. From the axial luminance measurements of the samples for each sample type the average luminance (Avg), minimum luminance (Min), maximum luminance (Max), standard deviation (Stdev), the standard deviation over the average luminance (stedev/avg), and the lower (dmin) and upper (dmax) bounds of the error bar were determined, Table 4.

TABLE 4

Cross Web Axial Luminance in a Turning Film System

| Sample Type | Avg | Min | Max | Stdev | Stdev/avg | dmin | dmax |
|---|---|---|---|---|---|---|---|
| S1 | 1997.0 | 1943.0 | 2040.0 | 26.5 | 0.01328 | 54.0 | 43.0 |
| S2 | 2478.0 | 2331.0 | 2575.0 | 82.6 | 0.03331 | 147.0 | 97.0 |
| S3 | 2730.2 | 2684.0 | 2763.0 | 23.2 | 0.00849 | 46.1 | 32.8 |
| S4 | 2029.3 | 1972.0 | 2072.0 | 34.7 | 0.01711 | 57.3 | 42.7 |
| S5 | 2451.5 | 2348.0 | 2551.0 | 74.5 | 0.03038 | 103.4 | 99.5 |
| S6 | 2725.7 | 2684.0 | 2774.0 | 24.8 | 0.00910 | 41.6 | 48.3 |
| S7 | 2175.1 | 2104.0 | 2239.0 | 46.6 | 0.02140 | 71.0 | 63.9 |
| S8 | 2690.6 | 2615.0 | 2767.0 | 41.0 | 0.01525 | 75.6 | 76.4 |
| S9 | 2750.1 | 2689.0 | 2809.0 | 37.1 | 0.01347 | 61.1 | 58.9 |
| S10 | 2198.3 | 2126.0 | 2247.0 | 36.0 | 0.01638 | 72.3 | 48.7 |
| S11 | 2701.8 | 2555.0 | 2676.0 | 42.2 | 0.01565 | 71.7 | 59.2 |
| S12 | 2790.3 | 2743.0 | 2839.0 | 28.5 | 0.01019 | 47.2 | 48.7 |

It can be observed from the Table 4 that the use of a quarter wave plate (S3, S6, S9, S12) in place of a reflective polarizer (S2, S5, S8, S11) alone results in less variation in axial luminance in backlight systems with wide-web turning films. It can also be observed that there is less variation in axial luminance in backlight systems with a quarter wave plate (S3, S6, S9, S12) than with only an absorbing polarizer (S1, S4, S7, S10). This reduction in axial luminance variation is believed to improve the brightness uniformity observed from a display.

The following are exemplary embodiments according to the present disclosure:

Item 1. A backlight, comprising:
  a lightguide;
  a reflector;
  at least one light source disposed along an edge of the lightguide;
  a wide-web turning film disposed on an opposite side of the lightguide from the reflector having a first major surface including prisms and a second major surface including a structured diffusing surface; and
  a reflective polarizer disposed further from the lightguide than the wide-web turning film having a quarter-wave retarder disposed thereon, the quarter-wave retarder being between the reflective polarizer and the wide-web turning film;

wherein the wide-web turning film includes a birefringent substrate, and the birefringent substrate has an in-plane fast axis that varies by at least five degrees over at least one direction;

wherein the quarter-wave retarder has a retardance for 550 nm light within 50 nm of 137.5 nm; and wherein the wide-web turning film has a diagonal size of at least 32 inches.

Item 2. The backlight of item 1, wherein the quarter-wave retarder includes liquid crystal.

Item 3. The backlight of item 1, wherein the reflective polarizer is a multilayer reflective polarizer.

Item 4. The backlight of item 1, wherein the birefringent substrate of the wide-web turning film includes polyethylene terephthalate.

Item 5. The backlight of item 1, wherein the backlight contains no other films besides the lightguide, the reflector, the turning film, and the reflective polarizer.

Item 6. The backlight of item 1, wherein the wide-web turning film has a diagonal size of at least 42 inches.

Item 7. The backlight of item 1, wherein the wide-web turning film has a diagonal size of at least 55 inches.

Item 8. The backlight of item 1, wherein the structured diffusing surface includes beads.

Item 9. The backlight of item 1, wherein the structured diffusing surface does not include beads.

Item 10. The backlight of item 1, wherein the light guide provides a narrow light output angle range, the output angle range having a full width half maximum being less than 30 degrees.

What is claimed is:

1. A backlight, comprising:
   a lightguide;
   a reflector;
   at least one light source disposed along an edge of the lightguide;
   a wide-web turning film disposed on an opposite side of the lightguide from the reflector having a first major surface including prisms and a second major surface including a structured diffusing surface; and
   a reflective polarizer disposed further from the lightguide than the wide-web turning film having a quarter-wave retarder disposed thereon, the quarter-wave retarder being between the reflective polarizer and the wide-web turning film;
   wherein the wide-web turning film includes a birefringent substrate, and the birefringent substrate has an in-plane fast axis that varies by at least five degrees over at least one direction;
   wherein the quarter-wave retarder has a retardance for 550 nm light within 50 nm of 137.5 nm; and
   wherein the wide-web turning film has a diagonal size of at least 32 inches.

2. The backlight of claim 1, wherein the quarter-wave retarder includes liquid crystal.

3. The backlight of claim 1, wherein the reflective polarizer is a multilayer reflective polarizer.

4. The backlight of claim 1, wherein the birefringent substrate of the wide-web turning film includes polyethylene terephthalate.

5. The backlight of claim 1, wherein the backlight contains no other films besides the lightguide, the reflector, the turning film, and the reflective polarizer.

6. The backlight of claim 1, wherein the wide-web turning film has a diagonal size of at least 42 inches.

7. The backlight of claim 1, wherein the wide-web turning film has a diagonal size of at least 55 inches.

8. The backlight of claim 1, wherein the structured diffusing surface includes beads.

9. The backlight of claim 1, wherein the structured diffusing surface does not include beads.

10. The backlight of claim 1, wherein the light guide provides a narrow light output angle range, the output angle range having a full width half maximum being less than 30 degrees.

* * * * *